US008352647B2

(12) United States Patent
Maezawa

(10) Patent No.: US 8,352,647 B2
(45) Date of Patent: Jan. 8, 2013

(54) METHOD AND SYSTEM FOR CONTROLLING INFORMATION ACCESSIBILITY BASED ON USER LOCATION

(75) Inventor: Hiroaki Maezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 151 days.

(21) Appl. No.: 12/636,823

(22) Filed: Dec. 14, 2009

(65) Prior Publication Data

US 2010/0318688 A1 Dec. 16, 2010

(30) Foreign Application Priority Data

Jun. 10, 2009 (JP) ................... 2009-139222

(51) Int. Cl.
*G06F 3/00* (2006.01)
(52) U.S. Cl. ............................. 710/29; 726/2
(58) Field of Classification Search ....... 710/17
See application file for complete search history.

(56) References Cited

U.S. PATENT DOCUMENTS

| 7,483,964 B1* | 1/2009 | Jackson et al. ............ 709/221 |
| 2003/0120940 A1* | 6/2003 | Vataja ..................... 713/193 |
| 2004/0125956 A1* | 7/2004 | Heiderscheit et al. ....... 380/258 |
| 2008/0222038 A1* | 9/2008 | Eden et al. ................ 705/44 |
| 2009/0158404 A1* | 6/2009 | Hahn et al. ............... 726/5 |

FOREIGN PATENT DOCUMENTS

| JP | 09-081516 A | 3/1997 |
| JP | 09-319662 A | 12/1997 |
| JP | 2004-062417 A | 2/2004 |
| JP | 2004-326580 A | 11/2004 |
| JP | 2005-128965 A | 5/2005 |

OTHER PUBLICATIONS

Concise Explanation of Submitted References for IDS, Dec. 14, 2009.

* cited by examiner

*Primary Examiner* — Elias Mamo
(74) *Attorney, Agent, or Firm* — Sughrue Mion, PLLC

(57) ABSTRACT

An information processing apparatus includes a user position information obtaining unit and an input availability control unit. The user position information obtaining unit obtains user position information corresponding to a position of a user. The input/output availability control unit control an availability of information between an input/output unit and a storage unit disposed at a position away from the user based on the obtained user position information, input/output unit being configured to receive information from the storage unit or being configured to output information to the storage unit.

6 Claims, 5 Drawing Sheets

METHOD AND SYSTEM FOR CONTROLLING INFORMATION ACCESSIBILITY BASED ON USER LOCATION

CROSS-REFERENCE TO RELATED APPLICATIONS

This application is based upon and claims priority under 35 USC 119 from Japanese Patent Application No. 2009-139222, filed Jun. 10, 2009.

BACKGROUND

Technical Field

The present invention relates to an information processing apparatus, an information processing system and programs.

SUMMARY OF THE INVENTION

According to an aspect of the invention, an information processing apparatus includes a user position information obtaining unit and an input availability control unit. The user position information obtaining unit obtains user position information corresponding to a position of a user. The input/output availability control unit control an availability of information between an input/output unit and a storage unit disposed at a position away from the user based on the obtained user position information, input/output unit being configured to receive information from the storage unit or being configured to output information to the storage unit.

BRIEF DESCRIPTION OF THE DRAWINGS

Exemplary embodiments of the invention will be described in detail based on the following figures, wherein.

DETAILED DESCRIPTION

An exemplary embodiment according to the present invention will be described below in detail on the basis of the accompanying drawings.

Figure 1:
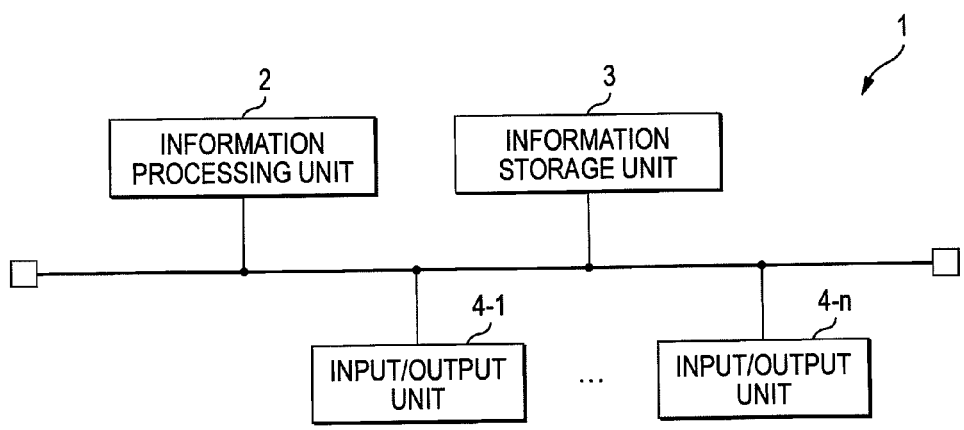
FIG. 1 is a view showing an example of the configuration of an information processing system according to an exemplary embodiment of the present invention.

FIG. 1 is a view showing an example of the configuration of an information processing system 1 according to the exemplary embodiment. As shown in FIG. 1, the information processing system 1 according to the exemplary embodiment includes an information processing unit 2, an information storage unit 3 and input/output units 4 (4-1 to 4-n). The information processing unit 2, the information storage unit 3 and the input/output units 4 are connected to a communication network, such as a LAN or the Internet, so as to be communicated with one another.

The information storage unit 3 shown in FIG. 1 is formed of, for example, a known storage device equipped with a storage unit, such as a ROM, a RAM or a hard disk drive, and a storage controller for controlling the input/output of information between the storage device and external units. In the exemplary embodiment, the information storage unit 3 stores, for example, at least one of two types of information: information received from the input/output unit 4 and information output to the input/output unit 4.

The input/output units 4 shown in FIG. 1 each include, for example, a control unit, such as a CPU; a storage unit, such as a ROM, a RAM or a hard disk drive; an output unit, such as a display; input units, such as a keyboard and a mouse; and a known personal computer or server computer equipped with a communication unit, such as a LAN card. In the exemplary embodiment, for example, application programs are stored in the input/output units 4. Furthermore, in the exemplary embodiment, the input/output units 4 operate according to the application programs. The application programs are supplied to the input/output units 4 via computer readable information transmission media, such as CD-ROMs and DVD-ROMs, or via a communication network, such as the Internet. The input/output units 4 may each be configured in a single housing or in multiple housings containing a server, a client, etc. Moreover, in the exemplary embodiment, the input/output units 4 each perform, for example, at least one of two functions: the input of information from the information storage unit 3 and the output of information to the information storage unit 3.

Figure 2:
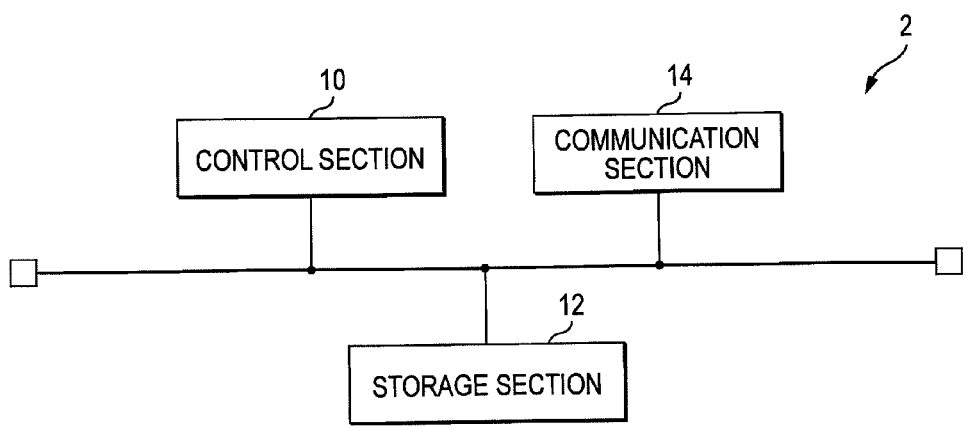
FIG. 2 is a view showing an example of the hardware configuration of an information processing unit according to the exemplary embodiment of the present invention.

FIG. 2 is a view showing an example of the hardware configuration of the information processing unit 2 according to the exemplary embodiment. As shown in FIG. 2, the information processing unit 2 according to the exemplary embodiment includes, for example, a control section 10, a storage section 12 and a communication section 14. These components are connected via a bus or the like. The control section 10 is a program control device, such as a CPU, and operates according to programs installed in the information processing unit 2. The storage section 12 is formed of a memory device, such as a ROM or a RAM, or a hard disk drive. For example, programs to be executed by the control section 10 are stored in the storage section 12. In addition, the storage section 12 also operates as the working memory of the control section 10. The communication section 14 is a communication interface, such as a LAN card, and transmits and receives information between the information storage unit 3 and the input/output units 4.

Figure 3:
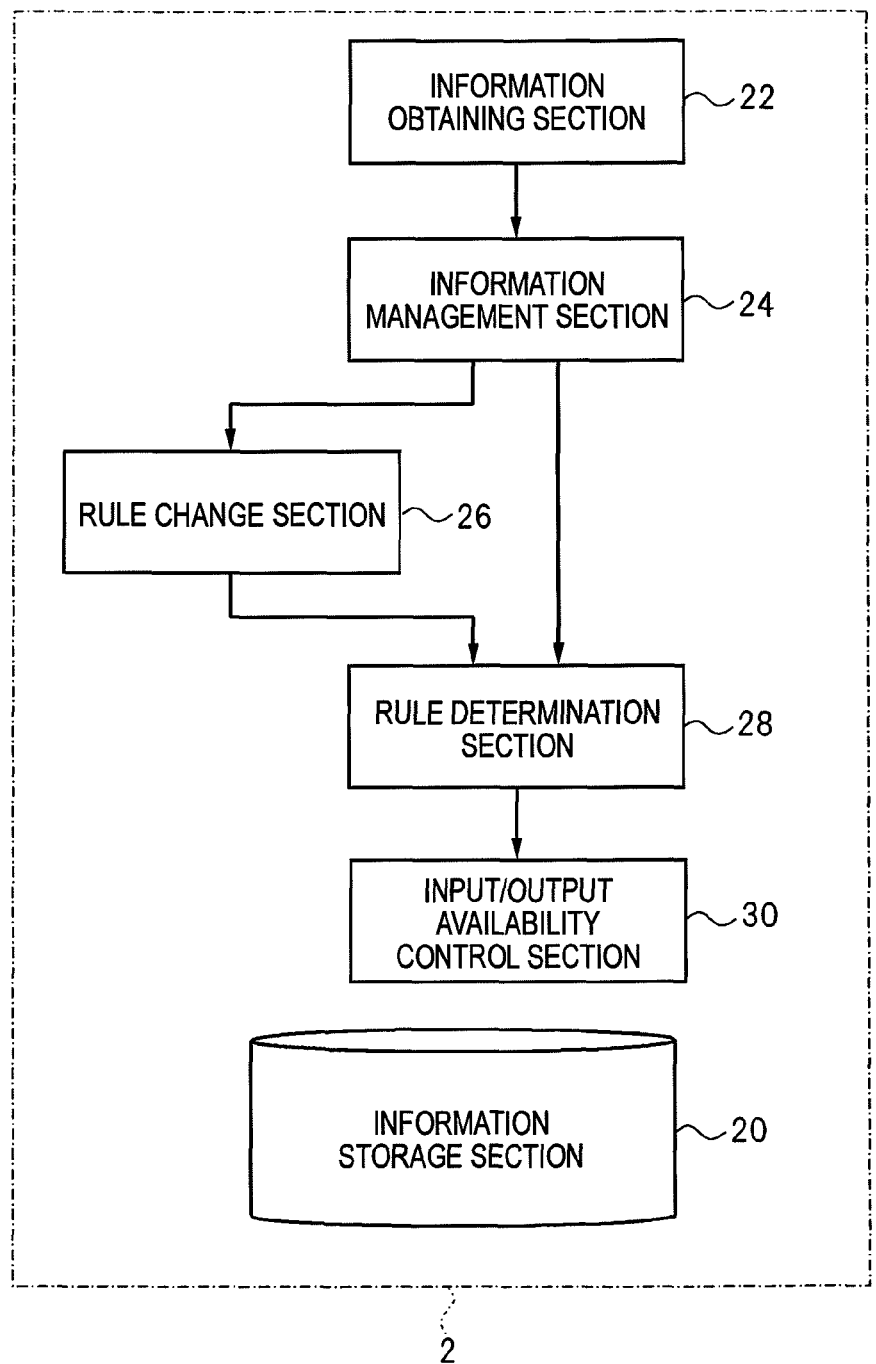
FIG. 3 is a functional block diagram showing examples of functions achieved using the information processing unit according to the exemplary embodiment of the present invention.

FIG. 3 is a functional block diagram showing examples of functions achieved using the information processing unit 2 according to the exemplary embodiment. As shown in FIG. 3, in the exemplary embodiment, the information processing unit 2 functions so as to include, for example, an information storage section 20, an information obtaining section 22, an information management section 24, a rule change section 26, a rule determination section 28 and an input/output availability control section 30. The information storage section 20 is mainly achieved using the storage section 12. The other components are mainly achieved using the control section 10.

These components are achieved by executing the programs installed in the information processing unit 2 serving as a computer in the control section 10 of the information processing unit 2. The programs are supplied to the information processing unit 2 via computer readable information transmission media, such as CD-ROMs and DVD-ROMs, or via a communication network, such as the Internet.

In the exemplary embodiment, the information processing unit 2 controls information input/output availability between the input/output unit 4 and the information storage unit 3, for example, according to the rules (hereafter referred to as input/output rules) determined using the rule determination section 28. Then, the rule determination section 28 determines the input/output rules on the basis of the position corresponding to the information storage unit 3. The input/output rules will be described later in detail.

In the exemplary embodiment, the information of the user of the information storage unit 3 is stored (registered) beforehand in the information storage unit 3. Then, the information storage unit 3 executes processing, such as storing information (for example, files, documents and records of database) received from the user, deleting stored information, setting attributes for stored information, and outputting the attributes set for the stored information, in response to a request from the user registered in the information storage unit 3. As described above, in the exemplary embodiment, the information storage unit 3 is associated with the user. Furthermore, in the exemplary embodiment, for example, the information stored in the information storage unit 3 is stored so as to be associated with secrecy degree information indicating the secrecy degree of the stored information. The secrecy degree information indicates, for example, a number denoting the degree of secrecy (for example, the larger the number, the higher the degree of secrecy) or a character string indicating the rank in the degree of secrecy (for example, a character string, such as "top secret", "high secret", "intermediate secret" or "low secret"). The secrecy degree information may be associated with individual pieces of information (for example, files, documents and records of database). Furthermore, the secrecy degree information may also be associated with multiple information sets. Specifically speaking, the secrecy degree information may also be associated with, for example, a folder containing multiple files or a physical storage device (a hard disk drive or a storage medium) storing multiple files. In the case that the secrecy degree information is associated with multiple information sets, the degree of secrecy indicating the secrecy degree information may also be applied to the individual pieces of information (for example, a specific folder and individual files inside the folder or a specific hard disk drive and individual files stored in the hard disk drive) belonging to the sets.

Figure 4:
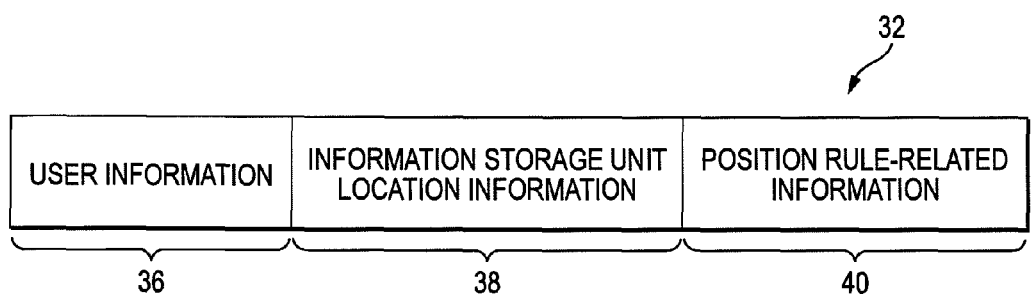
FIG. 4 is a view showing an example of the data structure of information storage unit information.
Figure 5:
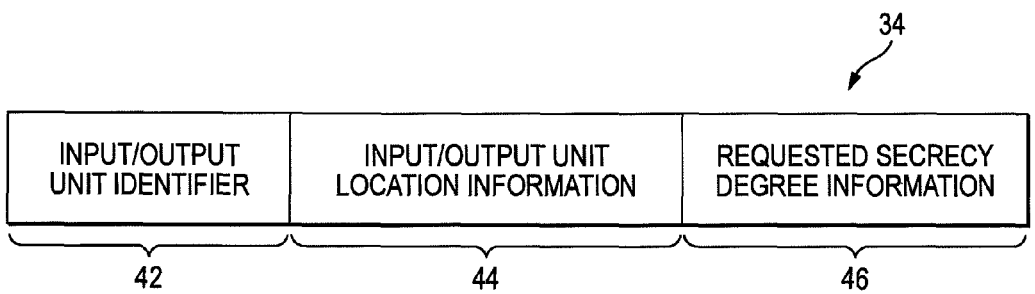
FIG. 5 is a view showing an example of the data structure of input/output unit information.

In the exemplary embodiment, the information storage unit information 32 shown in FIG. 4 and the input/output unit information 34 shown in FIG. 5 are stored beforehand in the information storage section 20. FIG. 4 is a view showing an example of the data structure of the information storage unit information 32. FIG. 5 is a view showing an example of the data structure of the input/output unit information 34.

In the exemplary embodiment, the information processing unit 2 receives, for example, the information storage unit information 32 from the user of the information storage unit 3 and stores the information storage unit information 32 in the information storage section 20. As shown in FIG. 4, the information storage unit information 32 includes, for example, user information 36 indicating the user of the information storage unit 3, an information storage unit location information 38 indicating the location of the information storage unit 3 (for example, the IP address, URL and server name of the information storage unit 3) and position rule-related information 40.

The position rule-related information 40 is, for example, information indicating the relationship between the position corresponding to the information storage unit 3 and the above-mentioned input/output rules. Specifically speaking, the position rule-related information 40 contains, for example, at least one combination of position condition information indicating the conditions regarding the position corresponding to the information storage unit 3 (for example, conditions regarding the position of the information storage unit 3 and conditions regarding the position of the user) and input/output rule information indicating input/output rules adopted under the conditions (for example, rules for permitting (or prohibiting) access (for example, reading and/or writing) to the information storage unit 3 and rules for permitting (or prohibiting) access (for example, reading and/or writing) to the information associated with the secrecy degree information having a value indicating "top secret").

The conditions indicated by the position condition information may indicate conditions (for example, a condition that the input/output unit 4 and the user are in the same room and a condition that the distance between the input/output unit 4 and the user is within one meter) regarding the relationship between the position with respect to the information storage unit 3 (for example, the position of the information storage unit 3 and the position of the user of the information storage unit 3) and the position corresponding to the input/output unit 4 (for example, the position of the input/output unit 4 and the position of an entering/leaving management system for managing the entering/leaving of the user into/from a room in which the input/output unit 4 is located (for example, a system for authenticating the user who is permitted to enter/leave the room and for opening/closing the door of the room, more specifically, for example, a system for detecting the IC card brought into contact by the user who is permitted to enter/leave the room and for unlocking the door of the room). In addition, the conditions indicated by the position condition information may indicate conditions, for example, regarding the relationship between the position of the information storage unit 3 and the position of the user of the information storage unit 3 (for example, conditions regarding the distance between the position of the information storage unit 3 and the position of the user of the information storage unit 3).

Furthermore, the position rule-related information 40 may be set so that as the distance between the input/output unit 4 and the user is shorter, more amounts of information are permitted to be accessed by the input/output unit 4. More specifically, for example, the position rule-related information 40 may include the combination of position condition information indicating a condition that the distance between the input/output unit 4 and the user is within two meters and input/output rule information indicating an input/output rule that the input/output unit 4 is also permitted to access information associated with any types of secrecy degree information. The position rule-related information 40 may also include the combination of position condition information indicating a condition that the distance between the input/output unit 4 and the user is within five meters and input/output rule information indicating a rule that the input/output unit 4 is permitted to access information associated with the secrecy degree information having a value indicating "high secret", "intermediate secret" or "low secret" (in other words, the secrecy degree information having a value indicating other than "top secret".

Moreover, in the exemplary embodiment, the information processing unit 2, for example, receives the input/output unit information 34 from the user of the input/output unit 4 and stores the input/output unit information 34 in the information storage section 20. As shown in FIG. 5, the input/output unit information 34 includes, for example, an input/output unit identifier 42 serving as the identifier of the input/output unit 4, input/output unit location information 44 indicating the location of the input/output unit 4 (for example, the IP address, URL and server name of the input/output unit 4) and requested secrecy degree information 46. The requested secrecy degree information 46 indicates, for example, the degree of secrecy of the information used for the information processing executed by the input/output unit 4 and the degree of secrecy to be set for the output destination (for example, a folder or a hard disk drive) of the information output from the input/output unit 4 to the information storage unit 3.

An example of the processing performed by the information processing system 1 according to the exemplary embodiment will be described below referring to the flowchart shown in FIG. 6.

First, the input/output unit 4 generates or obtains the user information 36 indicating the user of the information storage unit 3 and information for specifying the positions corresponding to the information storage unit 3 and the user (for example, the position of the information storage unit 3 itself and the position of the user of the information storage unit 3) (hereafter referred to as position specifying information) (at step S101).

For example, in the case that the information storage unit 3 is a portable device, such as a personal computer, the input/output unit 4 performs infrared communication with the information storage unit 3, thereby obtaining the user information 36 indicating the user of the information storage unit 3 from the information storage unit 3, specifying (regarding) the position of the input/output unit 4 as the position of the information storage unit 3 obtained at the time, and generating the information for specifying the position (the position specifying information).

In addition, for example, in the case that the input/output unit 4 is equipped with an IC card reader, when the user of the information storage unit 3 brings his or her IC card into contact with the IC card reader provided for the input/output unit 4, the input/output unit 4 detects the contact action, obtains the user information 36 from the IC card, specifies (regards) the position of the input/output unit 4 as the position of the user obtained at the time, and generates the information for specifying the position (the position specifying information).

The method for obtaining the position specifying information using the input/output unit 4 is not limited to the above-mentioned method as a matter of course. For example, the input/output unit 4 may generate the position specifying information on the basis of the position specifying function of a GPS or the position of a wireless LAN connection point connected to the information storage unit 3. Furthermore, the input/output unit 4 may generate the position specifying information indicating that the user is in the room in the case that the fact that the user is in the room has been specified using the entering/leaving management system for managing the entering/leaving of the user into/from the room in which the input/output unit 4 is disposed.

Furthermore, the input/output unit 4 outputs the user information 36 and the position specifying information obtained in the process indicated at step S101 to the information processing unit 2, and the information obtaining section 22 of the information processing unit 2 obtains the user information 36 and the position specifying information (at step S102).

Figure 7:
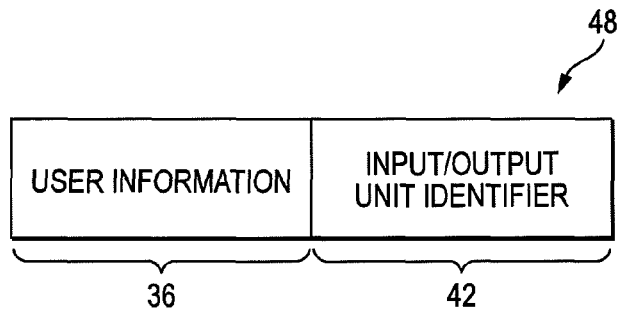
FIG. 7 is a view showing an example of the data structure of associating information.

Moreover, the information management section 24 confirms whether associating information 48 for associating the information storage unit 3 corresponding to the user information 36 obtained in the process indicated at step S102 shown in FIG. 7 with the input/output unit 4 serving as the output source of the information indicated at step S102 has already been stored in the information storage section 20 (at step S103). As shown in FIG. 7, the associating information 48 includes the user information 36 and the input/output unit identifier 42.

Figure 8:
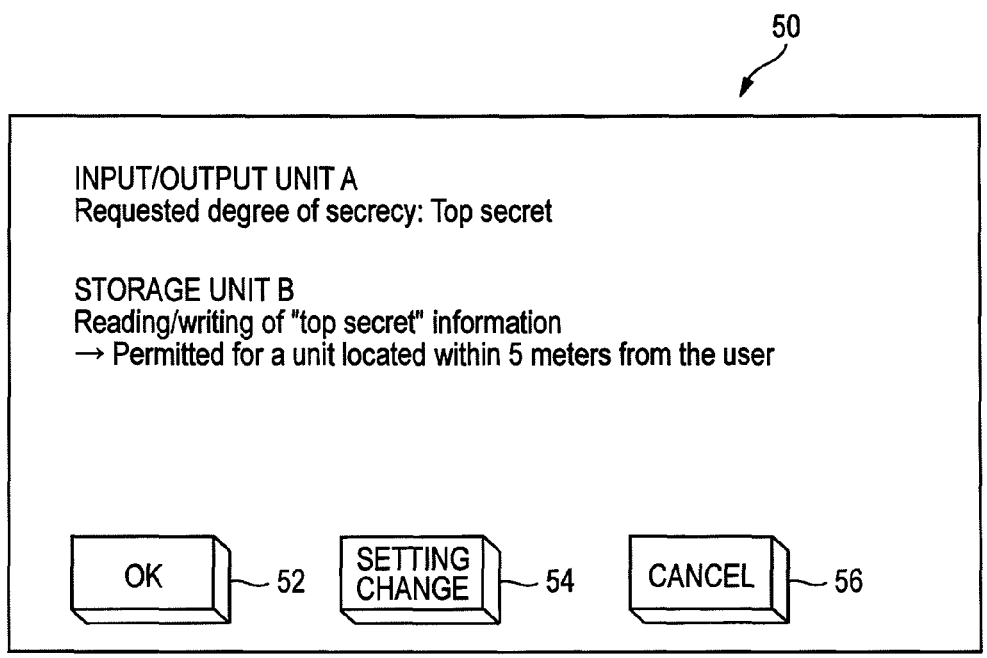
FIG. 8 is a view showing an example of a confirmation screen.

Still further, in the case that the information management section 24 confirms that the associating information 48 has not been stored (N at step S103), the information management section 24 displays/outputs a confirmation screen 50 shown in FIG. 8 on an output unit, such as a display provided for the input/output unit 4 (at step S104). The confirmation screen 50 includes information regarding the degree of secrecy indicated using the requested secrecy degree information 46 corresponding to the input/output unit 4 serving as the output source of the information indicated at step S102 and information regarding the position condition information and the input/output rule information included in the position rule-related information 40 corresponding to the user information 36 obtained in the process indicated at step S102. Additionally, the confirmation screen 50 includes an OK button 52, a setting change button 54 and a cancel button 56.

When the user of the information storage unit 3 presses the OK button 52, the setting change button 54 or the cancel button 56 using the mouse, the keyboard, etc. provided for the input/output unit 4, the input/output unit 4 outputs a signal indicating that one of the buttons was pressed to the information processing unit 2, and the information processing unit 2 receives this signal (at step S105).

Furthermore, the information management section 24 of the information processing unit 2 confirms whether the signal received in the process indicated at step S105 is a signal indicating that the cancel button 56 was pressed (at step S106). Moreover, when the information management section 24 confirms that the received signal is the signal indicating that the cancel button 56 was pressed (Y at step S106), the information processing unit 2 completes the process indicated in this process example.

When the information management section 24 confirms that the received signal is not the signal indicating that the cancel button 56 was pressed (N at step S106), the information management section 24 confirms whether the signal received in the process indicated at step S105 is a signal indicating that the setting change button 54 was pressed (at step S107). Moreover, when the information management section 24 confirms that the received signal is the signal indicating that the setting change button 54 was pressed (Y at step S107), the rule change section 26 generates the position rule-related information 40 in response to a request received via a setting change screen (not shown) from the user (at step S108). The rule change section 26 may change the position rule-related information 40 corresponding to the user information 36 obtained in the process indicated at step S102.

When the information management section 24 confirms that the received signal is not the signal indicating that the setting change button 54 was pressed in the process indicated at step S107 (N at step S107), the information management section 24 confirms whether the signal received in the process indicated at step S105 is a signal indicating that the OK button 52 was pressed (at step S109). When the information management section 24 confirms that the received signal is not the signal indicating that the OK button 52 was pressed (N at step S109), the information processing unit 2 completes the process indicated in this process example. In the case that the information management section 24 confirms that the received signal is the signal indicating that the OK button 52 was pressed (Y at step S109) or the process indicated at step S108 is completed, the information management section 24 generates the associating information 48 containing the user information 36 obtained in the process indicated at step S102 and the input/output unit identifier 42 serving as the identifier of the input/output unit 4 operating as the output source of the information indicated at step S102 and outputs the associating information 48 to the information storage section 20 (at step S110). At this time, the information management section 24 may associate the position rule-related information 40 generated in the process indicated at step S108 with the associating information 48 generated in the process indicated at step S110.

Furthermore, in the case that the information management section 24 confirms that the associating information 48 has been stored after the process indicated at step S110 or in the process indicated at step S103 (Y at step S103), the rule determination section 28 determines the input/output rules on the basis of the position specified using the position specifying information obtained in the process indicated at step S102 and the position rule-related information 40 (at step S111). The rule determination section 28 determines the input/output rules on the basis of, for example, the position rule-related information 40 associated with the user information 36 obtained in the process indicated at step S102. The rule determination section 28 determines, for example, the input/output rules associated with the conditions indicated in the position condition information included in the position rule-related information 40 satisfied by the positions corresponding to the information storage unit 3 and the user specified using the position specifying information obtained in the process indicated at step S102 as the input/output rules in this process example. In the case that the position rule-related information 40 associated with the associating information 48 in the process indicated at step S110 is present, the rule determination section 28 may determine the input/output rules on the basis of the position rule-related information 40. In this way, in the exemplary embodiment, the input/output rules to be adopted are changed using the position rule-related information 40 generated by the rule change section 26.

Furthermore, the rule determination section 28 may determine the input/output rules on the basis of the relationship between the position corresponding to the information storage unit 3 and the position corresponding to the input/output unit 4 (for example, the distance between the position corresponding to the information storage unit 3 and the position corresponding to the input/output unit 4) as indicated in the example of the above-mentioned position rule-related information 40.

Then, the input/output availability control section 30 controls the information input/output availability between the input/output unit 4 and the information storage unit according to the rules determined in the process indicated at step S111 (at step S112). More specifically, for example, when the input/output rules for permitting access to the information associated with the degree of secrecy indicated using the requested secrecy degree information 46 corresponding to the input/output unit 4 in the process indicated at step S111, the input/output availability control section 30 authorizes the input/output unit 4 to gain access to the input/output rules. The input/output availability control section 30 may perform setting corresponding to the input/output rules for the information storage unit 3 or for both the information storage unit 3 and the input/output unit 4. Furthermore, each time a request for writing or obtaining information from the input/output unit 4 to the information storage unit 3 is made, the input/output availability control section 30 may confirm whether access to the request is permitted. In the process indicated at step S111, when the input/output rules for permitting access to the information associated with the degree of secrecy indicated using the requested secrecy degree information 46 corresponding to the input/output unit 4 are determined, the input/output availability control section 30 may permit access to the request made from the input/output unit 4 to the information storage unit 3.

As described above, in this process example, the information processing unit 2 controls the input/output of information between the input/output unit 4 and the information storage unit 3.

Figure 6:
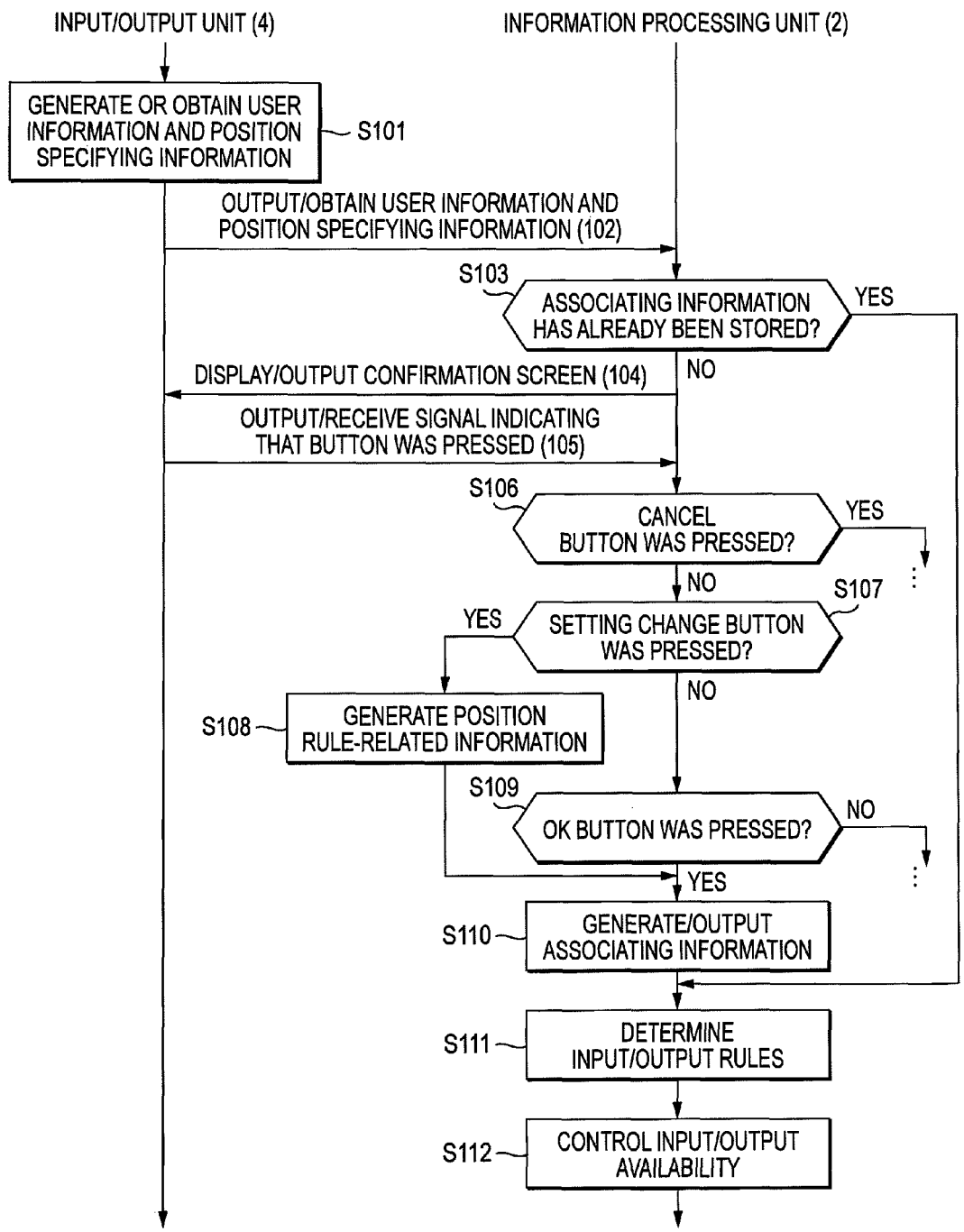
FIG. 6 is a flowchart showing an example of the flow of the processing performed by the information processing system according to the exemplary embodiment.

After the completion of the processes shown in FIG. 6, when the positions corresponding to the information storage unit 3 and the user change with the passage of time and do not satisfy conditions (for example, a condition that the user and the input/output unit 4 are in the same room) indicated using the position condition information serving as the basis of the determination of the input/output rules to be determined by the process indicated at step S111 described above, the input/output availability control section 30 determines new input/output rules based on the position corresponding to the information storage unit 3 obtained at the time and controls the input/output of information between the input/output unit 4 and the information storage unit 3 according to the input/output rules.

For example, the input/output availability control section 30 deprives the right of access permitted to the input/output unit 4. In another case, even if a request to write or obtain information is transmitted from the input/output unit 4 to the information storage unit 3, the input/output availability control section 30 performs control so as not to permit the request. At this time, the information processing unit 2 may notify the invalidity of the input/output rules determined in the process indicated at step S111 to the information storage unit 3 and the input/output unit 4.

The information processing unit 2 confirms that the positions corresponding to the information storage unit 3 and the user have not satisfied the conditions serving as the basis of the rules to be determined by the process indicated at step S111 described above, for example, when the information processing unit 2 detects that the user brought his or her IC card into contact with the IC card reader provided for the input/output unit 4 disposed in another room or another region or when the information processing unit 2 detects that a received signal at the wireless LAN point corresponding to the input/output unit 4 from an IC card equipped with a wireless LAN function ceased to exist. Furthermore, the information processing unit 2 may confirm that the positions corresponding to the information storage unit 3 and the user have not satisfied the conditions serving as the basis of the rules to be determined by the process indicated at step S111 described above when the information processing unit 2 detects that the time corresponding to one of the choices made with respect to time limitation, indicated on the IC card reader and selected by the user has passed. Moreover, the information processing unit 2 may confirm that the positions corresponding to the information storage unit 3 and the user have not satisfied the conditions serving as the basis of the rules to be determined by the process indicated at step S111 described above when the information processing unit 2 detects (for example, using a timer provided for the information processing unit 2) that a predetermined period has passed after the time when the user brought his or her IC card into contact with the IC card reader.

As described above, the information processing unit 2 according to the exemplary embodiment permits the input/ output of information between the input/output unit 4 and the information storage unit 3, for example, when the user approaches the input/output unit 4, and the information processing unit 2 prohibits the input/output of information between the input/output unit 4 and the information storage unit 3, for example, when the user is away from the input/output unit 4.

However, the present invention is not limited to the above-mentioned exemplary embodiment.

For example, the information storage unit 3 and the input/output unit 4 may be disposed outside the information processing system 1 and may be connected to the information processing system 1 via a communication network, such as the Internet.

Some of application examples of the above-mentioned exemplary embodiment will be described below.

First Application Example

In a first application example, the input/output unit 4 is disposed in a medical examination room, and medical application programs are executed in the input/output unit 4. Furthermore, the personal information regarding the user (patient) of the information storage unit 3 is stored in the information storage unit 3 so as to be associated with the secrecy degree information having a value indicating "top secret". In the case that the user (patient) is in the medical examination room, the information processing unit 2 permits the medical application programs to gain access to the personal information regarding the user (patient) stored in the information storage unit 3. Then, the medical application programs perform information processing (for example, reference to the history of medication and the output of examination result information) using the personal information regarding the user (patient). In the case that the user (patient) is not in the medical examination room, the information processing unit 2 does not permit the medical application programs to gain access to the personal information regarding the user (patient) stored in the information storage unit 3.

Second Application Example

In a second application example, the information storage unit 3 corresponds to a business system, a home server or the like, and the input/output unit 4 corresponds to a terminal, such as a console. Furthermore, in the case that the user of the information storage unit 3 is in the same room with the information storage unit 3, the information processing unit 2 permits the input/output of information from the input/output unit 4 to the information storage unit 3. Moreover, in the case that the user of the information storage unit 3 is not in the same room with the information storage unit 3, the information processing unit 2 does not permit the input/output of information from the input/output unit 4 to the information storage unit 3.

Third Application Example

In a third application example, the input/output unit 4 corresponds to an electronic advertisement display unit (signage). When the user brings his or her IC card into contact with the IC card reader provided for the electronic advertisement display unit, the information processing unit 2 permits the output of information from the input/output unit 4 to the information storage unit 3. Then, the input/output unit 4 outputs detailed information regarding displayed electronic advertisement to the information storage unit 3 (for example, a storage unit) owned by the user.

Fourth Application Example

In a fourth application example, the input/output unit 4 corresponds to the information supplying server of a place, such as a shop or a cafe. In the case that the user of the information storage unit 3 is in the shop or in the case that the user purchased a few items of merchandise in the shop, the information processing unit 2 permits the output of information from the input/output unit 4 to the information storage unit 3. Then, the input/output unit 4 outputs detailed information regarding the shop to the information storage unit 3.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The exemplary embodiments were chosen and described in order to best explain the principles of the invention and its practical application, thereby enabling other skilled in the art to understand the invention for various exemplary embodiments and with the various modifications as are suited to the particular use contemplated. It is intended that the scope of the invention be defined by the following claims and their equivalents.

What is claimed is:

1. An information processing apparatus comprising:
 a processor, the processor functioning as a user position information obtaining unit that obtains user position information corresponding to a position of a user;
 a storage unit that stores position rule-related information which includes position condition information indicating a distance between an input/output unit and the position of the user, and a rule to determine an access right for specific information based on the position condition information, and
 an input/output availability control unit that controls an availability of information between the input/output unit and the storage unit disposed at a position away from the user based on the obtained user position information and the position rule-related information, the input/output unit being configured to receive information from the storage unit or being configured to output information to the storage unit,
 wherein the position of the user is different from a position of the input/output unit, an input/output operation of the input/output unit is controlled based on the position condition information, the input/output availability control unit permits, based on the rule, the input/output unit to access first information when the position of the user and the position of the input/output unit are within a first distance, permits the input/output unit to access second information when the position of user and the position of the input/output unit are within a second distance, prohibits the input/output unit from accessing the first information when the position of the user and the position of the input/output unit are not within the first distance, and prohibits the input/output unit from accessing the second information when the position of the user and the position of the input/output unit are not within the second distance.

2. The information processing apparatus according to claim 1, wherein the position of the user changes according to passage of time.

3. The information processing apparatus according to claim 1, wherein the rule specifies at least one of information allowed to be input/output and information being disallowed to be input/output.

4. An information processing system comprising:
an input/output unit that is configured to receive information from a storage unit disposed at a position away from a user or that is configured to output information to the storage unit; and
an information processing apparatus that includes:
a processor, the processor functioning as a user position information obtaining unit that obtains user position information corresponding to a position of the user;
a storage unit that stores position rule-related information which includes position condition information indicating a distance between an input/output unit and the position of the user, and a rule to determine an access right for specific information based on the position condition information; and
an input/output availability control unit that controls an availability of information between the input/output unit and the storage unit based on the obtained user position information and the position-rule related information,
wherein the position of the user is different from a position of the input/output unit, an input/output operation of the input/output unit is controlled based on the position condition information, the input/output availability control unit permits, based on the rule, the input/output unit to access first information when the position of the user and the position of the input/output unit are within a first distance, permits the input/output unit to access second information when the position of user and the position of the input/output unit are within a second distance, prohibits the input/output unit from accessing the first information when the position of the user and the position of the input/output unit are not within the first distance, and prohibits the input/output unit from accessing the second information when the position of the user and the position of the input/output unit are not within the second distance.

5. A non-transitory computer readable storage medium that stores a software program causing a computer system to perform a process for controlling availability of information between an input/output unit and a storage unit, the process comprising:
obtaining user position information corresponding to a position of a user;
storing position rule-related information which includes position condition information indicating a distance between an input/output unit and the position of the user, and a rule to determine an access right for specific information based on the position condition information;
comparing the obtained user position information with a database that stores information of the position of the input/output unit;
determining a rule for controlling input/output availability according to the comparison result and the position-rule related information; and
controlling the availability based on the rule and the obtained user position information,
wherein the position of the user is different from a position of the input/output unit, and
wherein an input/output operation of the input/output unit is controlled based on the position condition information and the rule to permit the input/output unit to access first information when the position of the user and the position of the input/output unit are within a first distance, permit the input/output unit to access second information when the position of user and the position of the input/output unit are within a second distance, prohibit the input/output unit from accessing the first information when the position of the user and the position of the input/output unit are not within the first distance, and prohibit the input/output unit from accessing the second information when the position of the user and the position of the input/output unit are not within the second distance.

6. A method for controlling availability of information, the method comprising:
obtaining user position information corresponding to a position of a user;
storing position rule-related information which includes position condition information indicating a distance between an input/output unit and the position of the user, and a rule to determine an access right for specific information based on the position condition information;
comparing the obtained user position information with a database that stores information of the position of the input/output unit;
determining a rule for controlling input/output availability according to the comparison result and the position-rule related information; and
controlling the availability based on the rule and the obtained user position information,
wherein the position of the user is different from a position of the input/output unit, and
wherein an input/output operation of the input/output unit is controlled based on the position condition information and the rule to permit the input/output unit to access first information when the position of the user and the position of the input/output unit are within a first distance, permit the input/output unit to access second information when the position of user and the position of the input/output unit are within a second distance, prohibit the input/output unit from accessing the first information when the position of the user and the position of the input/output unit are not within the first distance, and prohibit the input/output unit from accessing the second information when the position of the user and the position of the input/output unit are not within the second distance.

* * * * *